United States Patent [19]

Yagi

[11] Patent Number: 5,068,845

[45] Date of Patent: Nov. 26, 1991

[54] OPTICAL PICKUP DEVICE FOR READING INFORMATION ON AN OPTICAL DISK

[75] Inventor: Katsuya Yagi, Hachioji, Japan

[73] Assignee: Konica Corporation, Tokyo, Japan

[21] Appl. No.: 625,852

[22] Filed: Dec. 11, 1990

[30] Foreign Application Priority Data

Dec. 14, 1989 [JP] Japan .................... 1-322619

[51] Int. Cl.$^5$ ................................. G11B 7/085
[52] U.S. Cl. ........................... 369/112; 369/44.14
[58] Field of Search .............. 369/112, 44.32, 44.33, 369/44.34, 44.37, 44.21, 44.14, 44.17, 44.19, 44.22, 100; 350/425, 572

[56] References Cited

U.S. PATENT DOCUMENTS

| | | | |
|---|---|---|---|
| 4,353,624 | 10/1982 | Yonekubo | 350/572 X |
| 4,586,814 | 5/1986 | Tokuhara | 350/425 X |
| 4,618,234 | 8/1986 | Ikari | 350/572 X |
| 4,688,201 | 8/1987 | Towner | 369/112 |
| 4,782,474 | 11/1988 | Asai et al. | 369/44.34 X |
| 4,785,438 | 11/1988 | Mizunoe | 369/44.37 |
| 4,959,824 | 9/1990 | Ueda et al. | 369/112 X |

FOREIGN PATENT DOCUMENTS

| | | | |
|---|---|---|---|
| 1196097 | 10/1985 | Canada | 369/44.32 X |
| 0200327 | 8/1988 | Japan | 369/44.21 X |

OTHER PUBLICATIONS

"Experiment of High-Speed Access Optical Device"; Collection of Lectures at the Spring Meeting 1985 of the Japanese Association of Precision Machines, No. 146, Junichi Ichihara, pp. 667 and 668 and partial translation.

"A High-Stiffness Optical Head for Quick Access and Precise Tracking Access" (SPIE vol. 529, Optical Mass Data Storage (1985)); pp. 150–155; Watabe, Akinore, et al.

*Primary Examiner*—Donald McElheny, Jr.
*Attorney, Agent, or Firm*—Frishauf, Holtz, Goodman & Woodward

[57] ABSTRACT

Disclosed is an optical pickup device for use in an optical disk unit, which comprises a moving optical system and a fixed optical system. The moving optical system has a focussing lens confronting a disk-shaped information-recording medium and moves linearly in the radial direction of the information-recording medium. On the fixed optical system are disposed a beam-deflecting lens as tracking means and a relay lens for conjugating the position of the principal point of this beam-deflecting lens with the position of the focal point on the beam-incident side of the object lens when the moving optical system is present at an intermediate position within the moving range of the moving optical system. In the optical pickup device having this structure, track offset can be diminished over the entire reproduction region, and since no tracking means is disposed in the moving optical system, high-speed excess can be easily performed.

3 Claims, 2 Drawing Sheets

→ TO RELAY LENS

PRIOR ART

OPTICAL PICKUP DEVICE FOR READING INFORMATION ON AN OPTICAL DISK

BACKGROUND OF THE INVENTION

(1) Field of the Invention

The present invention relates to an optical pickup device of an optical disk unit.

(2) Description of the Related Art

In order to increase the access speed of an optical disk unit, it is necessary to reduce the weight of a movable part of the optical pickup device, and it is preferred that only a part of a necessary minimum function be movable and other parts be fixed.

As the means for reducing the weight of the movable part in the optical pickup device, there has been known a method in which a rotary moving mirror is arranged as the tracking means on a fixed optical system (see "Collection of Lectures at Spring Meeting, 1985 of Japanese Association of Precision Machines, No. 146").

More specifically, this optical pickup device comprises a moving optical system having a focussing object lens confronting a disk-shaped information-recording medium and moving (making a stroke) linearly in the radial direction of the information-recording medium, and a fixed optical system secured to the device body and comprising a light source, a beam splitter, a collimator and an optical detector arranged on an optical path divided by the beam splitter, wherein a rotary movable mirror having a rotation angle controlled for tracking is arranged as a part of the fixed optical system between the moving optical system and the fixed optical system.

In this optical pickup device of this type, the tracking quantity is determined by the deflection angle of the beam incident on the object lens. When this deflection angle is kept constant, the track offset quantity is in proportion to the deflection quantity of the beam on the focal plane (the plane vertical to the optical axis at the focus of the optical system) of the object lens on the beam-incident side. The deflection of the beam caused by rotation of a rotary reflecting mirror increases according to the distance from the rotary reflecting mirror and especially increases at the stroke end of the moving optical system.

Accordingly, in the method in which an ordinary movable mirror having the center of rotation in the vicinity of the mirror surface is merely separated to the side of the fixed optical system, a large track offset is produced when the moving optical system separates from the rotary movable mirror.

Furthermore, a method in which another moving means such as a parallel plane plate rotation actuator is disposed to correct this offset is defective in that means for controlling this actuator becomes necessary and the structure becomes complicated.

SUMMARY OF THE INVENTION

It is therefore a primary object of the present invention to overcome the above defects of the conventional techniques and provide an optical pickup device in which generation of the track offset is controlled to such a low level that no practical problem arises.

More specifically, in accordance with the present invention, there is provided an optical pickup device comprising a moving optical system having a focussing object lens confronting a disk-shaped information-recording medium and moving linearly in the radial direction of the information-recording medium and a reflecting mirror for bending substantially at a right angle a beam incident on the object lens, and a fixed optical system secured to the device body and comprising a light source, a beam splitter, a beam-deflecting lens held movably in one direction orthogonal to the optical axis from the beam splitter, a relay lens which conjugates the position of the principal point of the beam-deflecting lens with the position of the focus on the beam-incident side of the object lens when the moving optical system is present at an intermediate position within the moving range of the moving optical system, and an optical detector arranged on an optical path divided by the beam splitter.

Namely, the present invention is characterized in that when the moving optical system (object lens) is present at an intermediate position within the moving range thereof, the position of the principal point of the beam-deflecting lens is conjugated (the relation between an object and an image in the optical system) with the position of the focus on the beam-incident side of the object lens, and this characteristic feature is realized by arranging a relay lens in an optical path between the beam-deflecting lens and the object lens.

In the above-mentioned structure, while the moving optical system is present at an intermediate position within the moving range thereof, even if the beam-deflecting lens is moved for tracking, any dislocation of the position of the beam incident on the object lens is not caused and track offset is not brought about.

When the moving optical system deviates from the intermediate position, dislocation of the beam-incident position is caused and track offset is generated. However, even at the stroke end of the moving optical system, the quantity of the movement from the position where the deflection of the incident beam is zero is only ½ of the entire stroke length, and therefore, the quantity of the generated deflection of the beam is very small.

According to a specific embodiment, a collimator is arranged at a position intermediate between the beam splitter and the beam-deflecting lens. Alternatively, the function of the collimator can be given the beam-deflecting lens.

The characteristic structure of the present invention and the functional effect attained by this characteristic structure will now be described in detail with reference to the following embodiments.

DETAILED DESCRIPTION OF THE PREFERRED EMBODIMENTS

Figure 1:
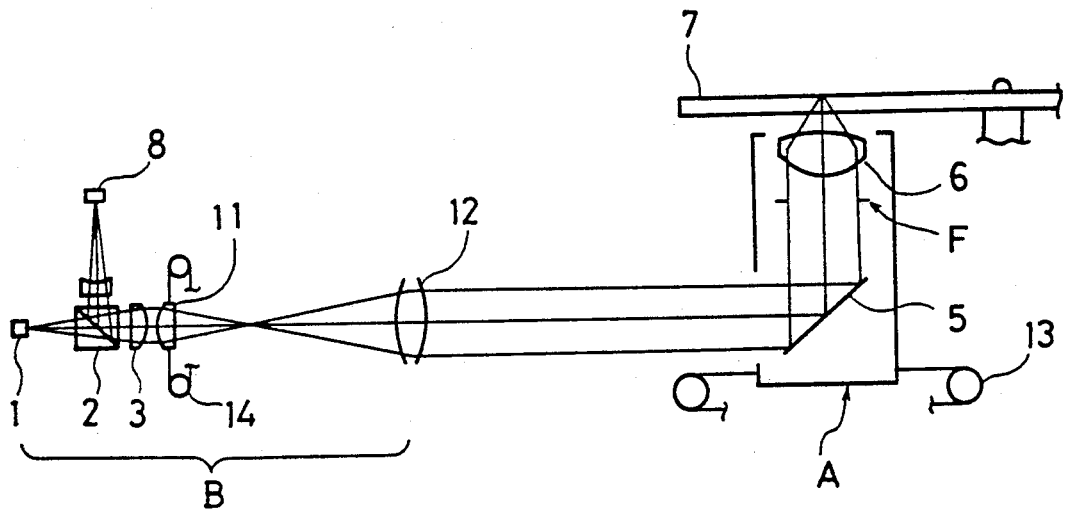
FIG. 1 is a diagram illustrating the outline of an optical system according to one embodiment of the present invention.

Referring to FIG. 1 illustrating one embodiment of the present invention, beam from a light source 1 are formed into parallel beams through a beam splitter 2 and a collimator lens 3 and are focussed as a spot on a disk 7 as the information-recording medium while the focussing position is controlled by a beam-deflecting lens 11, a relay lens 12, a reflecting mirror 5 and an object lens 6 held movably in the focussing direction (vertical direction in the drawings). The reflected beams are made incident on an optical detector 8 through the same course by the beam splitter 2.

The light source 1, beam splitter 2, collimator lens 3, beam-deflecting lens 11, relay lens 12 and optical detector 8 are secured to the device body (the beam-deflecting lens 11 is arranged movably, as described hereinafter) to construct a fixed optical system B.

The reflecting mirror 5 and object lens 6 constitute a movable part which is linearly moved in the radial direction (access direction; horizontal direction in the drawings) between the point close to the center of the disk 7 and the point close to the periphery of the disk 7 at the time of reproduction by a driving mechanism 13. Namely, the reflecting mirror 5 and object lens 6 constitute a moving optical system A.

The beam-deflecting lens 11 is arranged so that it is moved for tracking in one direction orthogonal to the optical axis from the beam splitter 2 (vertical direction in the drawings) by a driving mechanism 14.

Figure 2:
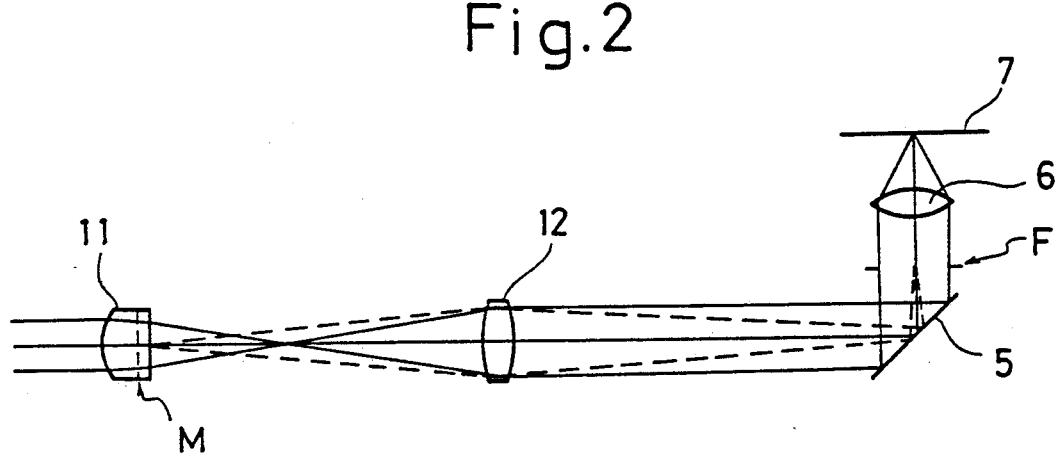
FIG. 2 is a diagram illustrating the function of the embodiment shown in FIG. 1.

As shown in FIG. 2, the relay lens 12 is arranged on an optical path between the beam-deflecting lens 11 and object lens 6. When the moving optical system A (mirror 5 and lens 6) is present at an intermediate position within the moving range thereof (the position of ½ of the entire stroke length), an image of the position M of the principal point of the beam-deflecting lens 11 is focussed on the position F of the focus on the beam-incident side of the object lens 6. At this intermediate position, even if the beam-deflecting lens 11 is moved for tracking, dislocation of the position of the beam incident on the object lens 6 is not caused, and therefore, track offset is not brought about.

Of course, if the moving optical system deviates from this intermediate position, dislocation of the beam-incident position is caused and track offset is generated.

However, even at the stroke end of the moving optical system, the quantity of the movement from the position where the deflection of the incident beam is zero is only ¼ of the movement quantity in the conventional technique, and therefore, the quantity of the produced deflection of the beam as a whole can be controlled to a very low level.

Figure 4:
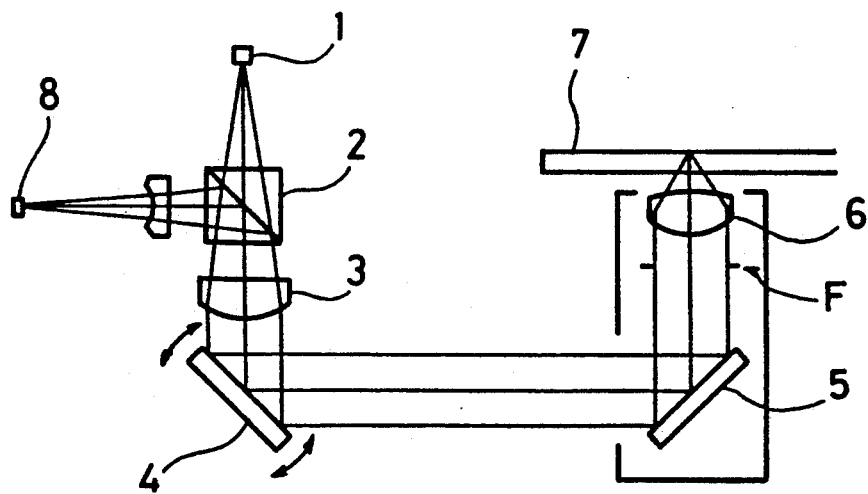
FIG. 4 is a diagram illustrating the outline of conventional system for comparison.

This will now be described with reference to FIG. 4 illustrating the conventional technique.

In the conventional technique shown in FIG. 4, beams from a light source 1 are formed into parallel beams through a beam splitter 2 and a collimator lens 3 and are focussed to a spot on a disk 7 while the focussing position is controlled by a rotary movable mirror 4, a reflecting mirror 5 and an object lens 6. Reflected beams are made incident on an optical detector 8 along the same course by the beam splitter 2. The light source 1, beam splitter 2, collimator lens 3 and optical detector 8 are secured to the device body, and the reflecting mirror 5 and object lens 6 constitute a moving part which moves linearly in the radial direction between a portion close to the center of the disk 7 and a portion close to the periphery of the disk 7 at the time of reproduction. The rotary movable mirror 4 is located between these fixed and moving parts and the rotation angle of the mirror 4 is controlled for tracking.

In the optical pickup device of this type, as pointed out hereinbefore, the tracking quantity is determined by the deflection angle of the beam incident on the object lens 6. When this deflection angle is kept constant, the track offset quantity is in proportion to the deflection quantity of the beam on the focal plane F on the beam-incident side of the object lens 6. The deflection of the beam caused by rotation of the rotary reflecting mirror 4 increases according to the distance from the rotary reflecting mirror 4 and becomes especially large at the stroke end of the moving optical system. For example, supposing that in the case where the moving part is located at the position of the periphery, the distance between the rotary moving mirror 4 and the reflecting mirror 5 is 30 mm, the stroke length of the moving part is 30 mm, the distance between the reflecting mirror 5 and the object lens 6 is 19 mm and the focal distance of the object lens 6 is 4 mm, the distance between the rotary moving mirror 4 and the focal plane F on the beam-incident side of the object lens 6 is 45 mm ($=30+19-4$) to 75 mm ($=30+30+19-4$), and the deflection quantity of the beam on the focal plane F on the beam-incident side of the object lens 6 per 10 tracks (0.016 mm) is 0.18 mm [$=(45/4)\times 0.016$] at the position of the periphery and 0.30 mm [$=(75/4)\times 0.016$] at the position of the inner circumference.

In contrast, in the device of the present invention shown in FIG. 1, even at the stroke end of the moving optical system, the quantity of the movement from the position where the deflection of the incident beam is zero is only $\pm 15$ mm ($=30/2$), and therefore, the quantity of the generated deflection of the beam is within a range of $\pm 0.06$ mm [$=(15/4)\times 0.016$] and is very small as a whole.

Figure 3:
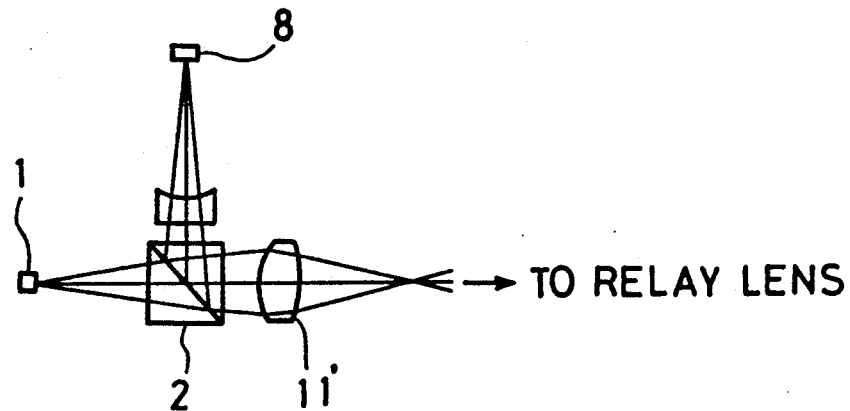
FIG. 3 is a diagram illustrating the outline of an optical system according to another embodiment of the present invention.

FIG. 3 illustrates another embodiment of the present invention. In this embodiment, beams from the light source 1 are incident as diverged beams into a beam-deflecting lens 11'. In this embodiment, the beam-deflecting lens 11' also exerts the function of a collimator lens, and the size of the optical system can be diminished. In the case where it is intended to increase the coupling efficiency of beams from the light source 1, an appropriate coupling lens is disposed between the light source 1 and the beam-deflecting lens 11'.

In the case where a semiconductor laser is used as the light source and beams from the light source form an elliptical shape, a function of collecting the sectional shape of the beams can be exerted by using appropriate cylindrical lenses for the beam-deflecting lens and relay lens.

As is apparent from the foregoing description, in the optical pickup device of the present invention, by disposing in a fixed optical system secured on the device body a beam-deflecting lens and a relay lens for conjugating the position of the principal point of this beam-deflecting lens with the position of the focal point on the beam-incident side of an object lens when a moving optical system is present at an intermediate position within the moving range thereof, there can be attained an effect of reducing track offset over the entire reproduction range to such an extent that no practical problem arises. Furthermore, since there is no tracking means disposed on the moving optical system, there can be attained an effect of facilitating high-speed access.

What is claimed is:

1. An optical pickup device for reading information stored on a disk-shaped information storage medium, which has a periphery, a center, and a radius R extending from said center to said periphery, comprising:

a fixed optical system secured to said optical pickup device, said fixed optical system including:

a light source;

a beam splitter for splitting light from said light source;

a beam deflecting lens having an optical axis and a principal point, said beam deflecting lens being positioned to receive light from said beam splitter and being movable only in a direction substantially orthogonal to said optical axis of said deflecting lens; and a relay lens for relaying light to and from said beam deflecting lens; and a movable optical system movable linearly in a plane parallel to said disk-shaped information storage medium along said radius R of said disk-shaped information storage medium, said movable optical system having:

a focussing object lens positioned to read said information stored on said disk-shaped storage medium; and reflecting mirror for reflecting light from said relay lens substantially perpendicularly to said focussing object lens and for reflecting light from said focussing object lens substantially perpendicularly back to said relay lens;

said focussing object lens having a focal point located at a position between said focussing object lens and said reflecting mirror;

said relay lens conjugating the position of said principal point of said beam deflecting lens with said focal point of said focussing object lens when said moving optical system is present at an intermediate position within the moving range of said movable optical system; and an optical detector positioned to receive light from said focussing object lens after reflection by said reflecting mirror and passage through said beam splitter.

2. An optical pickup device as set forth in claim 1, comprising a collimator lens arranged between the beam splitter and the beam-deflecting lens in said fixed optical system.

3. An optical pickup device as set forth in claim 1, wherein said beam-deflecting lens also functions as a collimator lens.

* * * * *